United States Patent

[11] 3,554,180

| [72] | Inventor | Carl W. Lesser<br>Swartz Creek, Mich. |
|---|---|---|
| [21] | Appl. No. | 809,100 |
| [22] | Filed | Mar. 21, 1969 |
| [45] | Patented | Jan. 12, 1971 |
| [73] | Assignee | General Motors Corporation<br>Detroit, Mich.<br>a corporation of Delaware |

[54] VALVE STEM SEAL
3 Claims, 5 Drawing Figs.

[52] U.S. Cl. .................................................. 123/188,
277/187, 277/189, 123/90
[51] Int. Cl. ............................................. F01l 3/08
[50] Field of Search ....................................... 123/188p,
90.37; 277/182, 186, 189, 170, 171, 33, 24, (Inquired)

[56] References Cited
UNITED STATES PATENTS
2,157,867  5/1939  Robertson .................... 123/188P

| 2,878,799 | 3/1959 | Brenneke ..................... | 123/188P |
| 3,333,578 | 8/1967 | Muller ........................... | 123/188P |
| 3,480,286 | 11/1969 | Kosatka ....................... | 123/188P |

Primary Examiner—Carlton R. Croyle
Assistant Examiner—Cort Flint
Attorneys—J. L. Carpenter and E. J. Biskup ABSTRACT: A two-piece valve stem seal for preventing the passage of oil between a valve guide and a valve stem in an internal combustion engine includes an apertured elastomeric sealing ring having converging frustoconical surfaces forming a sharp radially inwardly facing seal lip that is adapted to sealingly engage the valve stem and a cup-shaped retaining cap telescopically received over the sealing ring with a corrugated cylindrical sleeve frictionally engaging the valve guide for compressively loading the sealing ring and radially inwardly biasing the seal lip.

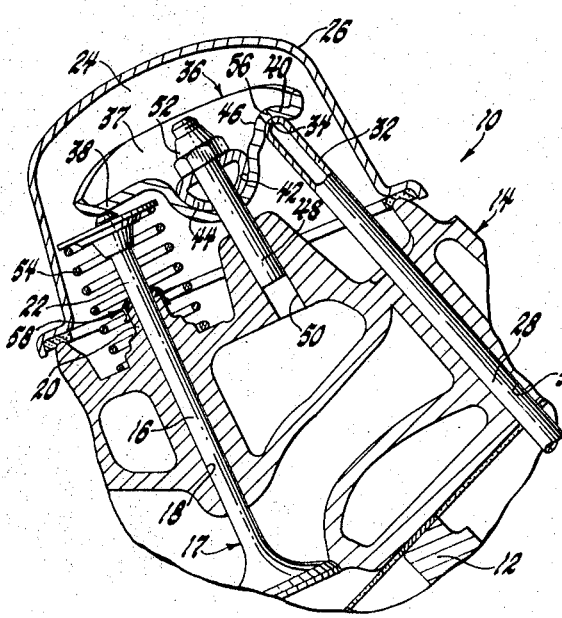

VALVE STEM SEAL

Internal combustion engines of the type used in motor vehicles ordinarily have a poppet valve that is axially reciprocably mounted in a valve guide in the cylinder head. A rocker arm operated by a camshaft engages one end of the valve stem opposite the valve head to selectively open and close the poppet valve for admitting a combustible mixture of fuel and air or discharging the products of combustion. During operation of the engine, oil is continuously supplied to the valve mechanism, a portion of which in the form of a spray or mist contacts and flows downwardly along the valve stems. Where a clearance exists between the valve stem and valve guide, the oil is drawn into the combustion chamber in the case of intake valves, or into the exhaust manifold in the case of exhaust valves. In either event, this leakage causes an increase in oil consumption and an impairment of proper engine performance.

The present invention contemplates providing a simple two-piece valve stem seal in the form of an elastomeric sealing ring and a metallic retaining cap for positively preventing the aforementioned leakage of oil. The sealing ring includes converging frustoconical surfaces that intersect at a sharp radially inwardly facing seal lip that is adapted to resiliently engage the outer surface of the valve stem and effect a positive barrier to the flow of oil. The retaining cap is telescopically inserted over the sealing ring and the valve guide and serves to axially compress the sealing ring against the valve guide and radially inwardly bias the seal lip. This manner of loading the sealing ring insures positive sealing on contact with the valve stem despite eccentricity between the latter and the valve guide.

Accordingly, it is an object of the present invention to provide a simplified two-piece valve stem seal for preventing a passage of oil between the valve stem and the valve guide in an internal combustion engine.

Another object of the present invention is to provide a sealing arrangement for the valve stems of an internal combustion engine which includes a centrally apertured elastomeric sealing member having a seal lip defined by converging frustoconical surfaces that is adapted to engage the valve stem to prevent the passage of oil. the sealing member being retained on the valve guide and the seal lip being inwardly biased by a cup-shaped retaining member that axially compressively loads the sealing member against the valve guide.

A further object of the present invention is to provide a two-piece valve stem seal that is readily assembled on the valve guide of an internal combustion engine and includes an elastomeric sealing ring having a sharp seal lip engageable with the valve stem that is radially inwardly biased by a retaining cap as the latter is telescopically pressed over the outer surface of the valve stem guide.

Still another object of the present invention is to provide an internal combustion valve stem seal of a two-piece construction wherein a cup-shaped retaining cap having a cylindrical lower portion including inwardly extending indentations which telescopically frictionally engage the valve stem guide serves to axially compressively load an elastomeric sealing ring having converging frustoconical surfaces defining a seal lip such that the latter is radially inwardly biased into engagement with the engine valve stem.

These and other objects will be apparent to one skilled in the art upon reading the following detailed description, reference being made to the accompanying drawings in which:

FIG. 1 is a partially sectioned view of an internal combustion engine incorporating a valve stem seal made in accordance with the present invention;

FIG. 2 is an enlarged view of the valve stem seal shown in FIG. 1;

FIG. 3 is an enlarged, partially sectioned view of the valve stem seal of FIG. 2 showing the sealing engagement between the sealing ring and the valve stem;

FIG. 4 is a view taken along line 4—4 of FIG. 2; and

FIG. 5 is an enlarged exploded cross-sectional view of the valve stem seal shown in FIGS. 1 through 4.

Referring to FIG. 1, there is illustrated a portion of an internal combustion engine 10 of a conventional overhead valve type including a cylinder block 12 and a water jacketed cylinder head 14. A cylindrical valve stem 16 of a poppet valve 17 is slidably guided for axial reciprocation in a bore 18 of a valve guide 20 formed on the cylinder head 14. While an intake valve is illustrated, it will become apparent that the present invention is equally applicable to exhaust valves. The upper end 22 of the valve 17 projects upwardly of the bore 18 into a chamber 24 defined by the upper surface of the cylinder head 14 and a rocker arm cover 26. A hollow push rod 28 which is disposed laterally of the poppet valve 17 extends through a bore 30 in the cylinder head 14 and has an upper end 32 including a port 34 extending into the chamber 24. As is conventional, the lower end of the push rod 28 engages a cam mechanism (not shown) to effect selective reciprocation of the push rod 28. During operation of the engine, oil from the engine lubrication system (not shown) is continuously supplied to the chamber 24 through the push rod 28 and the port 34. The manner of supplying the oil under pressure is conventional and forms no part of the invention and, therefore, no further description is deemed necessary.

A rocker arm 36 operatively connects the valve stem 16 and the push rod 28 and includes arms 38 and 40 overlying and resting upon the upper ends 22 and 32 of the valve stem 16 and the push rod 28, respectively. The rocker arm 36 has a generally dish-shaped configuration defining an oil receiving reservoir area 37 and includes a central socket 42 which receives a bearing member 44 having a correspondingly shaped bottom surface that forms a seating surface for the rocker arm 36. The arm 40 includes a downwardly opening depression 46 for receiving the upper end 32 of the push rod 28 in bearing relation. A stud 48 is fixedly retained in a hole 50 formed in the cylinder head 14 and is provided with a threaded nut 52 at its upper end that serves to retain the bearing member 44.

In operation, an upward movement of the push rod 28 causes the rocker arm 36 to rotate about the bearing member 44 in a counterclockwise direction thereby downwardly shifting the valve stem 16 and effecting an opening of the valve 17 against the biasing force of a coiled spring 54. On the return stroke, the force of the spring 54 drives the rocker arm 36 clockwise about the bearing member 44 thereby closing the valve 17 and effecting a return of the push rod 28. Since at all times an upward thrust is exerted upon arms 38 and 40, the socket 42 continuously engages the bearing member 44 and the rocker arm 36 is restrained against rotation about the axis of the stud 48.

When the engine 10 is operating, oil is continuously fed from the engine lubrication system through the push rod 28 and port 34 where it flows outwardly to area 37 through a port 56 formed in the depression 46 of arm 40. The port 56 is sufficiently larger than the port 34 so as to be in constant register therewith and provide a continuous supply of lubricating oil to the rocker arm 36 and between the socket 42 and the bearing member 44. The excess oil spills over the sides of the rocker arm 36 and by surface tension, mist or spray additionally lubricates the upper ends 22 and 32 of the valve guide 20 and push rod 28, respectively.

While the aforementioned supply of oil is regulated, the amount of oil supplied may be excessive and the spillage will contact and run down the valve stem 16. Oftentimes, oil will be drawn down the bore 18 of the valve guide 20 by the reciprocating action of the valve 17 or through any clearance that may exist between the valve stem 16 and the bore 18. In the case of an intake valve, the mixing of the oil with the combustion mixture will impair proper operation of the engine and, in the case of an exhaust valve, the oil will mix with the exhaust gases and result in exhaust smoking, each of which will lead to an excessive oil consumption. In order to obviate this problem, the present invention incorporates a valve stem oil seal, generally indicated by the reference numeral 58, to prevent the passage of oil from the chamber 24 down the valve stem 16.

Referring to FIG. 5, the valve stem seal 58 generally comprises an elastomeric sealing ring 60 and a metallic retaining cap 62. The sealing ring 60 is generally circular in shape and includes a planar base 64 and an upper surface 66 extending upwardly and inwardly from a cylindrical peripheral rim 68. The upper surface 66 is in the form of a large or wide angle cone having an approach angle A with respect to a plane normal to the axis 70 of the valve stem seal 58. The sealing ring 60 further includes a centrally located aperture defined by a surface 72 in the form of a low angle cone having an approach angle B toward the axis 70. The intersection of the surface 72 and the upper surface 66 defines a sharp radially inwardly facing seal lip 74, the inner diameter of which is sized smaller than the outer diameter of the valve stem 16 such that, in assembly, the seal lip 74 provides a positive sealing contact with the reciprocating valve stem 16 to thereby prevent the flow of oil through the bore 18. In practice, the relative diameters of the valve stem 16 and seal lip 74 should be established to provide positive sealing contact for a predetermined range of eccentricity between the valve guide 20, the valve stem 16 and the bore 18.

The retaining cap 62 has generally "bottlecap" configuration and includes a frustoconical upper surface or top 76 having a central aperture 78 and a downwardly extending cylindrical sleeve 80 terminating with a radially outwardly extending flange 82. The top 76 has an approach angle C with respect to a plane normal to the seal axis 70 which is substantially the same as angle A of the sealing ring 60. As shown in FIG. 4, eight inwardly extending indentations 84 are formed in and evenly circumferentially spaced about the sleeve 80. The indentations 84, as illustrated in FIG. 5, form a corrugated surface having an inner diameter D. The inner diameter D is smaller than the outer diameter 85 of the valve guide 20 such that the retaining cap 62 will be securely frictionally retained on the valve guide 20 in assembly.

Referring to FIGS. 2 and 3, the valve stem seal 58 is assembled by inserting the sealing ring 60 into retaining cap 62 with the surface 66 engaging the complementary inner surface of top 76 and, by use of an appropriate hand tool engaging the flange 82, the indentations 84 are telescopically pressed over the outer surface of the valve guide 20 until base 64 engages the top surface of the valve guide 20 and the sealing ring 60 is axially compressively loaded. As most clearly shown in FIG. 3, the seal lip 74 will deform radially inward into sealing contact with valve stem 16 and axially adjacent the aperture 78. Because of the compressive loading of the sealing ring 60 between the top 76 and the top surface of the valve guide 20, and the mutually engaging conical surfaces, a radially inward biasing will exist on the seal lip 74. This biasing will establish a sufficient lip pressure such that positive sealing engagement will be maintained despite eccentricities between the bore 18, the valve stem 16, and the outer diameter 85 of the valve guide 20 during reciprocation of the valve 17.

A highly satisfactory valve stem seal, made in accordance with the present invention, has been successfully operated and tested on the intake and exhaust valves in an internal combustion engine using the following dimensions:

| | |
|---|---:|
| Diameter of valve stem 16 inch | 372 |
| Inner diameter of seal lip 74 do | 359 |
| Inner diameter of indentations 84 do | 625 |
| Outer diameter 85 of valve guide 20 do | 642 |
| Conical angle A of surface 66 degrees | 30 |
| Conical angle B of surface 72 do | 10 |
| Conical angle C of top 76 do | 30 |
| Axial compression of sealing ring 60 percent | 10 |
| Eccentricity between valve stem 16 and valve guide 20 (TIR) | 030 |
| Material for sealing ring 60 | (¹) |

¹ Polyacrylic rubber.

Although only one form of this invention has been shown and described, other forms will be readily apparent to those skilled in the art. Therefore, it is not intended to limit the scope of this invention by the embodiment selected for the purpose of this disclosure but only by the claims which follow.

I claim:

1. A valve stem seal for an internal combustion engine having a valve stem axially reciprocable relative to a valve guide comprising: a circular elastomeric sealing ring having a planar lower surface engageable with an upper surface of the valve guide, said sealing ring having a centrally located aperture defined by a low angle frustoconical surface which converges upwardly and inwardly from said lower surface; and upper surface on said sealing ring defined by a wide angle frustoconical surface which is coaxial with and converges upwardly and inwardly toward said aperture and intersects said low angle frustoconical surface to define a sharp seal lip which has a diametrical interference with the valve stem for establishing sealing contact with the latter; and a retaining member having an aperture formed therein and adapted to be telescopically received over said valve stem and said sealing ring, said retaining member having a frustoconical surface compressively engaging said upper surface of said sealing ring in assembly for radially inwardly biasing the seal lip and thereby maintaining said sealing contact with said valve stem within predetermined limits of eccentricity between the latter and said valve guide.

2. A two-piece valve stem seal for preventing the passage of oil between a valve guide and a valve stem axially reciprocably mounted therein, comprising: a metallic cup-shaped retaining cap having a frustoconical top which has a relatively large approach angle with respect to the longitudinal axis of said valve stem and a downwardly depending cylindrical sleeve including a corrugated interior surface which is adapted to frictionally grip an outer surface of the valve guide in assembly; a circular elastomeric sealing ring adapted to be received within said retaining cap and having a planar base located in a plane substantially normal to said axis and engageable in assembly with an upper surface of said valve guide; an upper frustoconical surface formed in said sealing ring and converging upwardly and inwardly from said base toward the axis with an approach angle substantially equal to said approach angle of the top of said retaining cap; a central aperture defied by an inner frustoconical surface formed in said sealing ring coaxially with said upper frustoconical surface and converging upwardly and inwardly from said base toward the axis with a relatively low approach angle, said inner frustoconical surface intersecting said upper frustoconical surface at a sharp radially inwardly facing seal lip which has a diametrical interference with said valve stem for establishing sealing contact therewith, said sealing ring being axially compressively loaded between said retaining cap and said valve guide in assembly whereby said seal lip is radially inwardly biased into sealing contact with said valve stem within predetermined limits of eccentricity between the latter and said valve guide.

3. In an internal combustion engine having a valve stem axially reciprocable relative to a valve guide and sealed by a two-piece valve stem seal which comprises a circular elastomeric sealing ring located in a plane having a base substantially normal to the longitudinal axis of said valve stem and engageable with an upper surface of said valve guide in assembly; an upper frustoconical surface formed in said sealing ring and converging upwardly and inwardly from said base toward said axis with an approach angle of approximately 60°, said sealing ring having a central frustoconical aperture formed therein converging upwardly and inwardly from said base toward said axis with an approach angle of approximately 10°, said aperture intersecting said upper frustoconical surface at a sharp radially inwardly facing seal lip having a diametrical interference with said valve stem in assembly when received over the latter with said base engaging said upper surface of said valve guide; a metallic cup-shaped retaining cap having a frustoconical top portion which has an approach angle with respect to said axis of said seal approximately 60°, said retaining cap including a downwardly depending cylindrical sleeve having a plurality of circumferentially spaced indentations formed therein defining a corrugated interior surface adapted to frictionally engage an outer surface of the valve guide in assembly so that said sealing ring is axially compressively loaded between said top portion of said retaining cap and said upper surface of said valve guide whereby said seal lip is radially inwardly biased into sealing contact with said valve stem to prevent the passage of oil between the latter and said valve guide and maintain said sealing contact within predetermined limits of eccentricity between said valve stem and valve guide.